United States Patent [19]

Ochiai et al.

[11] Patent Number: 4,831,394

[45] Date of Patent: May 16, 1989

[54] ELECTRODE ASSEMBLY AND IMAGE RECORDING APPARATUS USING SAME

[75] Inventors: Toshihiko Ochiai, Tokyo; Yujiro Ando, Yokohama, both of Japan

[73] Assignee: Canon Kabushiki Kaisha, Tokyo, Japan

[21] Appl. No.: 139,163

[22] Filed: Dec. 21, 1987

Related U.S. Application Data

[63] Continuation of Ser. No. 78,652, Jul. 28, 1987, abandoned.

[30] Foreign Application Priority Data

Jul. 30, 1986 [JP] Japan ............................... 61-179455

[51] Int. Cl.$^4$ ............................................ G01D 15/00

[52] U.S. Cl. .................................. 346/160.1; 346/155

[58] Field of Search ..................... 346/150, 153.1, 155, 346/160.1, 74.2–74.4, 139 R, 139 C; 355/3 DD, 14 D; 101/DIG. 5, DIG. 13; 400/119; 358/300, 301, 294, 295

[56] References Cited

U.S. PATENT DOCUMENTS

| | | | |
|---|---|---|---|
| 3,879,737 | 4/1975 | Lunde | 346/150 |
| 4,502,061 | 2/1985 | Ando et al. | 346/153.1 |
| 4,573,063 | 2/1985 | Fujii et al. | 346/153.1 |

*Primary Examiner*—Arthur G. Evans

*Attorney, Agent, or Firm*—Fitzpatrick, Cella, Harper & Scinto

[57] ABSTRACT

A recording electrode assembly which is relatively moved with respect to a recording medium, for depositing onto the recording medium electrically conductive and magnetic toner magnetically conveyed, the assembly includes an array of recording electrodes, electrically isolated from each other, adapted to be supplied with an electric voltage representing information to be recorded, wherein the array is adapted to extend transversely with a direction of the relative movement of the recording material; a supporting member for supporting the array of the recording electrodes; and a conductive member, electrically isolated from the recording electrodes, for providing a surface member at an upstream of the recording electrodes with respect to a direction of movement of the toner magnetically conveyed.

22 Claims, 3 Drawing Sheets

ELECTRODE ASSEMBLY AND IMAGE RECORDING APPARATUS USING SAME

This application is a continuation of application Ser. No. 078,652 filed 7/28/87 abandoned.

FIELD OF THE INVENTION AND RELATED ART

The present invention relates to an electrode assembly and an image recording apparatus using the electrode assembly, more particularly to those wherein electrically conductive and magnetic toner particles are passed through a clearance between a recording electrode assembly and a recording medium, across which a voltage is applied to imagewisely deposite the toner particles on the recording medium by electrostatic force, the apparatus being usable as a printer and display or the like.

The image recording apparatus of this type are disclosed in Japanese Patent Application Publication No. 46707/1976 (U.S. Pat. No. 3,914,771) and U.S. Pat. Nos. 3,816,840 and 3,879,737. In the present apparatus, as shown in FIG. 4, the conductive and magnetic toner 1 is conveyed on a stationary non-magnetic sleeve 3 enclosing a rotational magnet roller 2 (the direction of toner conveyance is opposite to the rotational direction of the magnet 2). On the sleeve 3, an array of electrodes 4 made of magnetic material is fixed by an insulating member 13 having a slanted surface. The toner is conveyed over the electrodes 4 in the form of magnetic brush. A voltage E is selectively applied by switching circuit S, in accordance with an image signal, between the electrodes and a conductive layer 7 of the recording material 5 having a surface insulating layer 6. By this, electric charge is injected through the chain of toner particles constituting the magnetic brush to the toner particles of the ends of the brush, while electric charge is induced on the insulating layer 6 of the recording material. The electrostatic force between the injected charge and the induced charge is effective to deposite the end toner particles to the recording medium 5 against the magnetic attraction force imparted by the magnet 2, whereby an image is formed on the recording medium.

As shown in FIG. 5 in an enlarged scale, it is inherent in this type of image forming apparatus for the recording medium 5 to be brushed or frictioned by the toner 1, and the toner particles constituting the brush diverge or expand toward the recording medium 5 from the recording electrode assembly 4. For these reasons, when voltage is applied to the recording electrode 4, the electric charge is given and taken beyond a necessary region on the recording medium, with the result that the toner is unintentionally deposited around or outside the printing portion, as shown in FIG. 6. Further, the electrostatic attraction force exists beyond the necessary region between the toner and the recording medium 5, so that the recording medium 5 is easily contaminated by friction with the toner, and therefore, is relatively quickly deteriorated.

SUMMARY OF THE INVENTION

Accordingly, it is a principal object of the present invention to provide an electrode assembly and an image recording apparatus using such an electrode assembly which can provide an improved image quality.

It is another object of the present invention to provide an electrode assembly and an image recording apparatus using same wherein life of the recording medium is improved.

It is a further object of the present invention to provide an electrode assembly capable of forming a sharp image.

It is a further object of the present invention to provide an image recording apparatus using the electrode.

According to an embodiment of the present invention, the recording electrode comprises an array of recording electrodes arranged in a direction transverse with a movement direction of conductive and magnetic toner and conductive member disposed upstream of the electrode array with respect to toner movement direction, the conductive member is being electrically isolated from the recording electrodes. In the image recording apparatus using such an electrode assembly, the recording electrodes are opposed closely to the recording medium, and the conductive and magnetic toner is supplied to between the electrodes and the recording medium.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
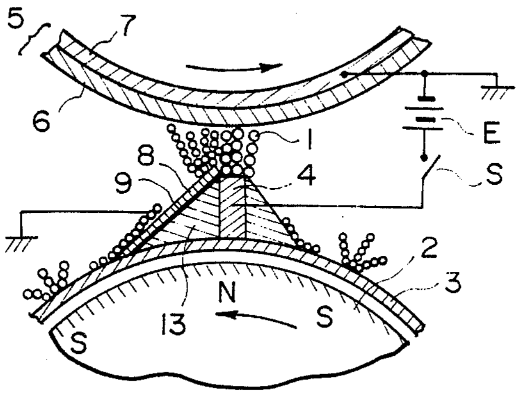
FIG. 1 is a sectional view of a recording electrode assembly according to an embodiment of the present invention.

Referring now to FIG. 1, there is shown an electrode assembly according to an embodiment of the present invention.

Since the structure is similar to that of FIG. 4 described hereinbefore, except for the electrode assembly which will be described, the detailed explanation is omitted for the sake of simplicity.

Figure 2:
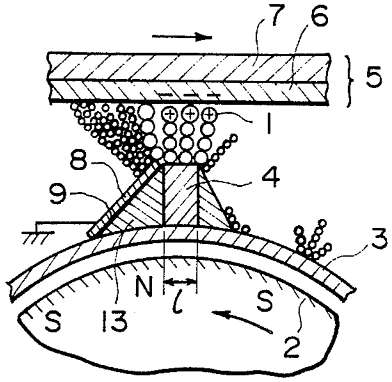
FIG. 2 is an enlarged sectional view of the same.

FIG. 2 is an enlarged view of FIG. 1.

Figure 7:
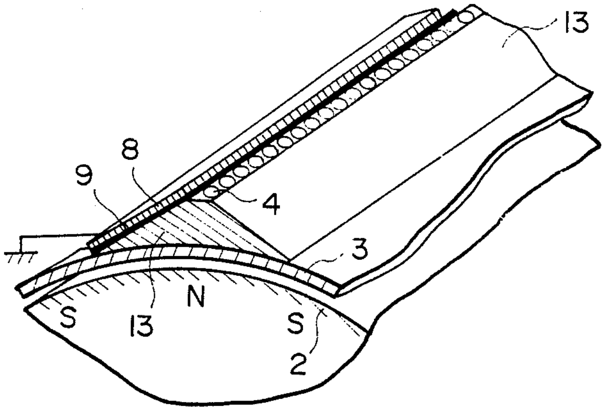
FIG. 7 is a perspective view of the recording electrode assembly.

FIG. 7 is a perspective view of the recording electrode assembly of FIG. 1 embodiment.

In FIGS. 1 and 2, reference numeral 1 depicts electrically conductive and magnetic toner. The toner is conveyed on a sleeve 3 of non-magnetic material such as stainless steel and aluminum, which encloses a rotary magnet 2. The electrode assembly comprises an array of recording electrodes fixedly provided on the sleeve 3 and made of iron, copper or the like. Designated by reference numeral 5 is a recording medium on which an image is recorded by the electrode assembly. The recording medium 5 includes a dielectric layer 6 made of titanium oxide, aluminum oxide, phenol resin, butyral resin, transparent resin or the like and a conductive layer of aluminum evaporated, conductive titanium oxide or the like. An insulating member 13 having a slanted surface as shown in FIG. 1 and made of epoxy resin is fixed on the sleeve 3. On the slanted surface, an insulating layer 9 made of plastic resin or the like is provided.

A conductive layer 8 is provided on the insulating layer 9 and is of thin layer metal of copper, ferrite, aluminum or the like. The recording electrodes 4 are made of electrically conductive and magnetic material, and the end edges thereof are exposed. The conductive layer 8 extend to the neighborhood of the recording electrodes 4 at an upstream side of the electrodes 4 with respect to a direction of movement of the toner on the sleeve 3 and over the electrode 4 edges, but is electrically isolated from the recording electrodes 4 by means of the insulating layer 9. The conductive layer 8 is maintained at the same electric potential as the conductive layer 7 of the recording medium 5, more particularly the ground potential in this embodiment.

The magnet 2 has magnetic poles in the surface region of the magnet 2 and having opposite polarities alternately arranged circumferentially. By the rotation of the magnet 2, the toner is conveyed on the sleeve 3 and over the electrodes 4.

Figure 4:
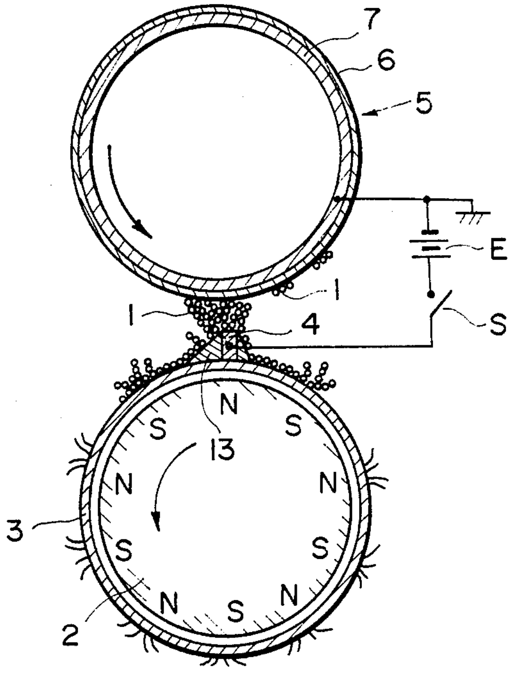
FIG. 4 is a sectional view of a conventional image recording apparatus.

The toner includes low resistance material toner particles ($10^3$–$10^7$ ohm.cn) As described with respect to FIG. 4, the toner is selectively deposited onto the surface of the recording medium 5 by electrostatic force resulting from electric charge injection introduced by signal voltage applied to the electrodes 4. As seen in FIGS. 1 and 2, the chains of the magnetic brush of toner are expanded toward the recording medium 5 from the electrode 4.

Figure 5:
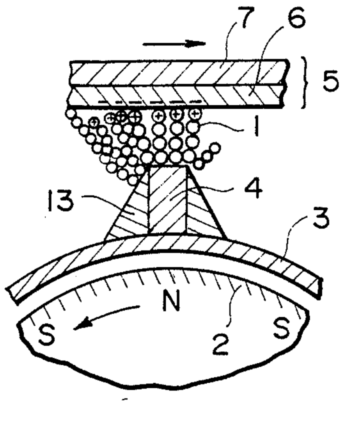
FIG. 5 is an enlarged view of the same.
Figure 6:
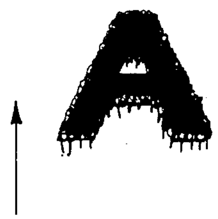
FIG. 6 is an example of an image provided by the conventional image recording apparatus.

As shown in FIG. 5, the toner particles into which the electric charge is injected contact a wide area of the recording medium 5, and therefore the charge-injected toner is deposited to an unnecessary area thereof.

Referring back to FIG. 2, in the embodiment of the present invention, the conductive electrodes 4 are exposed in the region where the electrodes 4 and the recording medium 5 are most closely opposed within a width 1 of 100 microns–5 mm, preferably 100 microns–2 mm. The conductive member or layer 8 upstream thereof is grounded, so that unnecessary electric charge is not injected into the toner, thus assuring that the toner particles are deposited only within the minimum required area, as contrasted to the conventional arrangement shown in FIG. 5. Additionally, the region of influential electrostatic force between the toner and the recording medium 5 is smaller in the embodiment than in the conventional arrangement, and therefore, the load imparted to the recording medium by the friction by the toner particles are decreased. Even if a relatively wide range of the magnetic brush is contacted to the recording medium surface, the charge injected portion thereof is smaller.

Figure 3:
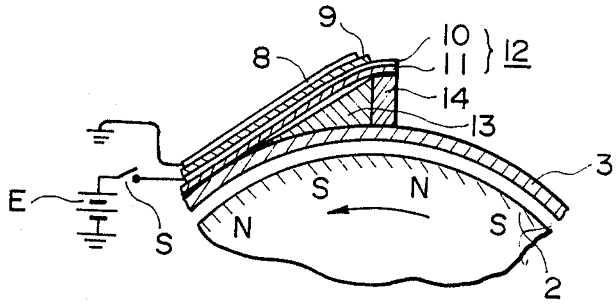
FIG. 3 is a sectional view of a recording electrode assembly according to another embodiment of the present invention.

FIG. 3 shows another embodiment of the present invention.

Figure 8:
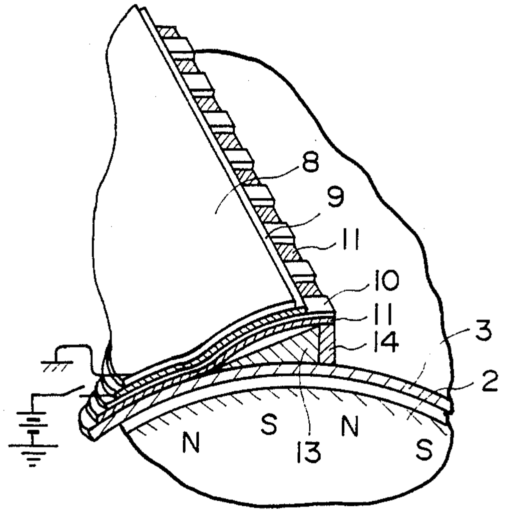
FIG. 8 is a perspective view of the recording electrode assembly of FIG. 3.

FIG. 8 is a perspective view of the recording electrode assembly of FIG. 3.

A magnetic member 14 of nickel, iron or the like is mounted on the surface of the non-magnetic sleeve and to the insulating member 13 having a slanted surface. The magnetic member 14 is effective to more strongly erect the chains of magnetic particles of the magnet brush in the recording zone. However, it may be of non-magnetic material such as plastic resin. On the magnetic member 14 a flexible print board 12 is bonded. The flexible print board includes an insulating base 11 made of polyimide resin, polyester resin or the like and conductive layer 10 patterned thereon into an array of electrodes. The patterned conductive layer 10 functions as the recording electrodes 4 in the previous embodiment. Further, an insulating layer 9 is provided, and further thereon, a conductive layer 8 is formed. The conductive layer 10 constituting the recording electrode array is exposed within a limited region necessary for recording, while the remainder is covered by the insulating layer 9 and the conductive layer 8. Therefore, unnecessary deposition of the toner to the recording medium 5 is prevented. The conductive layer 8 is maintained at the same electric potential as the conductive layer 7 (the ground potential in this embodiment), whereby prevention of the unnecessary toner deposition onto the recording medium 5 is assured.

Figure 9:
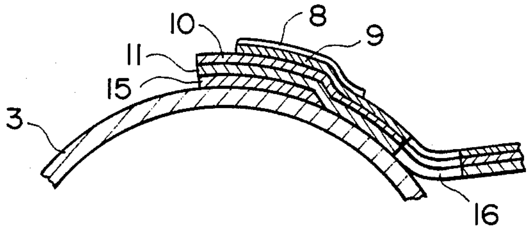
FIG. 9 is a sectional view of an electrode assembly according to a yet further embodiment of the present invention.

FIG. 9 illustrates a further embodiment of the present invention, which is different from FIG. 1 embodiment in that electrodes 4 also functioning as the magnetic members are not used, and also is different from FIG. 3 embodiment in that the magnetic member 14 separate from the electrodes 10 is not employed.

Since this embodiment is partly similar to the foregoing embodiments, the detailed explanation is omitted for the sake of simplicity by assigning the same reference numerals to the elements having corresponding function.

A conductive layer 15 is fixed on the sleeve 3, and it functions as a spacer, and it may be of magnetic material. In this embodiment, the recording electrode is provided with plural openings 16 arranged in the direction of main scan, that is, perpendicular to the sheet of drawing of FIG. 9. The opening may be an elongated continuous opening extending in the same direction. The openings function to direct the toner particles from the sleeve surface to the electrodes 10. The structure of the electrode 10 and the openings 16 are described in greater detail in U.S. Ser. No. 903,726 filed on Sept. 18, 1986 which has been assigned to the assignee of the present application.

In FIGS. 3 and 9 embodiment, the conductive layer 8 is electrically isolated from the recording electrode 10 by the insulating layer 9 and is effective to prevent charge injection to the toner particles outside the necessary region, in the same manner as in FIG. 1 embodiment, whereby unnecessary toner deposition in the unnecessary area is prevented.

As described in the foregoing, according to the present invention, the toner deposition onto the recording medium is limited within the necessary area, so that a clean and sharp image can be produced. Additionally, the friction by the toner with the recording medium is decreased, so that the deterioration of the recording medium is reduced.

While the invention has been described with reference to the structures disclosed herein, it is not confined to the details set forth and this application and is intended to cover such modifications or changes as may come within the purposes of the improvements or the scope of the following claims.

What is claimed is:

1. A recording electrode assembly, relatively movable with respect to a recording medium, for depositing onto the recording medium electrically conductive and magnetic toner having been magnetically conveyed, said assembly comprising:

an array of recording electrodes electrically isolated from each other, said electrodes adapted to be supplied with an electric voltage representing information to be recorded, wherein the array of recording electrodes is adapted to extend transversely with a direction of the relative movement of the recording material;

a supporting member for supporting said array of recording electrodes; and a conductive member, electrically isolated from said recording electrodes, for providing a surface member upstream of said recording electrodes with respect to a direction of movement of the magnetically conveyed toner.

2. An assembly according to claim 1, wherein said electrodes are made of electrically conductive and magnetic material.

3. An assembly according to claim 1, wherein the electrodes are made of electrically conductive and non-magnetic material.

4. An assembly according to claim 3, wherein a magnetic member is disposed between the electrodes and said supporting member.

5. An assembly according to claim 2, wherein said electrodes are projected from a surface of said supporting member.

6. An assembly according to claim 1, wherein said array of electrodes is constituted by a flexible printed board.

7. An assembly according to claim 6, wherein said array of electrodes is disposed along a surface of said supporting member with a spacer member interposed therebetween.

8. An assembly according to claim 7, wherein the spacer member is of magnetic material.

9. An assembly according to claim 6, wherein the printed board defines continuous slot or perforations along said array of the electrodes.

10. A recording electrode assembly, relatively moveable with respect to recording medium, for depositing onto the recording medium electrically conductive and magnetic toner having been magnetically conveyed, said assembly comprising:

an array of recording electrodes electrically isolated from each other, said electrodes adapted to be supplied with an electric voltage representing information to be recorded, wherein the array of recording electrodes is adapted to extend transversely with a direction of the relative movement of the recording material;

a sleeve of non-magnetic material for supporting on its outer surface said array of recording electrodes;

a conductive member, electrically isolated from said recording electrodes, for providing a surface member upstream of said recording electrodes with respect to a direction of movement of the magnetically conveyed toner; and magnetic means disposed inside said sleeve.

11. An assembly according to claim 10, wherein said magnetic means includes a rotatable magnet having magnetic poles arranged circumferentially.

12. An assembly according to claim 10, wherein said electrodes are projected from a surface of said supporting member.

13. An assembly according to claim 10, wherein said array of recording electrodes is constituted by a flexible printed board.

14. An assembly according to claim 13, wherein the printed board defines continuous slot or perforations along said array of the electrodes.

15. An image recording apparatus, comprising:

a recording electrode assembly, capable of being relatively moved with respect to a recording medium, for depositing onto the recording medium electrically conductive and magnetic toner magnetically conveyed, said assembly including an array of recording electrodes electrically isolated from each other, each electrode adapted to be supplied with an electric voltage representing information to be recorded, wherein the array is adapted to extend transversely with a direction of the relative movement of the recording material; a supporting member for supporting said array of the recording electrodes; a conductive member, electrically isolated from said recording electrodes, for providing a surface member upstream of said recording electrode with respect to a direction of movement of the toner;

magnetic means disposed across said supporting member from said array of electrodes, for supplying the toner to said array of the electrodes; and a recording medium disposed opposed closely to said array of the electrodes.

16. An apparatus according to claim 15, wherein said recording medium includes a conductive layer and an insulating surface layer, wherein said conductive member and the conductive layer of the recording medium are maintained at a substantially equal electric potential.

17. An apparatus according to claim 15, the recording medium and the toner particles move in the same direction.

18. An apparatus according to claim 15, wherein said array of the electrodes is constituted by a flexible print board.

19. An apparatus according to claim 15, wherein said array of electrodes is disposed along a surface of said supporting member with a spacer member interposed therebetween.

20. An apparatus according to claim 19, wherein the printed board defines continuous slot or perforations along said array of the electrodes.

21. An apparatus according to claim 15, wherein said magnetic means includes a magnet roller rotatable to convey the toner.

22. An image recording apparatus, comprising:

a recording electrode assembly, capable of being relatively moved with respect to a recording medium, for depositing onto the recording medium electrically conductive and magnetic toner magnetically conveyed, said assembly including an array of recording electrodes electrically isolated from each other, each electrode adapted to be supplied with an electric voltage representing information to be recorded, wherein the array is adapted to extend transversely with a direction of the relative movement of the recording material; a sleeve for supporting said array of the recording electrodes on its outer surface; a conductive member, electrically isolated from said recording electrodes, for providing a surface member upstream of said recording electrode with respect to a direction of movement of the toner;

magnetic means disposed within said sleeve from said array of electrodes, for supplying the toner to said array of the electrodes; and a recording medium disposed opposed closely to said array of the electrodes.

* * * * *

UNITED STATES PATENT AND TRADEMARK OFFICE
CERTIFICATE OF CORRECTION

PATENT NO. : 4,831,394

DATED : May 16, 1989

INVENTOR(S) : Ochiai, et al.

It is certified that error appears in the above-identified patent and that said Letters Patent is hereby corrected as shown below:

COLUMN 1

Line 16, change "imagewisely deposite" to --imagewise deposit--.

Line 41, change "deposite" to --deposit--.

COLUMN 2

Line 16, delete "is".

COLUMN 3

Line 17, change "extend" to --extends--.

Line 32, change "$10^3$-$10^7$ ohm.cn" to --$10^3$-$10^7$ ohm.cm--.

COLUMN 4

Line 29, change "electrodes 10" to --conductive layer 10--.

Line 36, change "of magnetic" to --of insulating material. It may be of magnetic or non-magnetic--.

Line 64, delete "and" (second occurrence).

UNITED STATES PATENT AND TRADEMARK OFFICE
CERTIFICATE OF CORRECTION

PATENT NO. : 4,831,394
DATED : May 16, 1989
INVENTOR(S) : Ochiai, et al.

It is certified that error appears in the above-identified patent and that said Letters Patent is hereby corrected as shown below:

COLUMN 6
Line 6, change "Claim 15, the" to --Claim 15, wherein the--.

Signed and Sealed this

Tenth Day of April, 1990

Attest:

HARRY F. MANBECK, JR.

*Attesting Officer*

*Commissioner of Patents and Trademarks*